United States Patent Office 3,579,469

Patented May 18, 1971

1

3,579,469
SILOXANE PAPER RELEASE COATINGS

Maurice E. Grenoble, Ballston Lake, N.Y., assignor to General Electric Company

No Drawing. Filed Dec. 13, 1968, Ser. No. 783,773
Int. Cl. C08k 1/66
U.S. Cl. 260—18 5 Claims

ABSTRACT OF THE DISCLOSURE

A paper release coating composition contains a silanol-terminated polysiloxane gum, a silane of the formula $HSiX_3$, where X is a hydrolyzable radical, a metal salt and an organic solvent. A surface of a sheet of paper is coated with the composition, the solvent is evaporated, and the silanol-terminated polysiloxane is cross-linked by reaction with the silane in the presence of moisture at an elevated temperature. The coated paper produced is useful as a backing sheet for bumper stickers.

This invention is concerned with a process of rendering cellulosic materials non-adherent to various organic solids. More particularly, the invention is concerned with a process for rendering paper non-adherent to normally adherent materials. The process comprises treating the cellulosic material with a mixture of ingredients comprising (1) a linear polydimethylsiloxane gum containing terminal silicon-bonded hydroxyl groups. (2) a silane of the formula:

$$HSiX_3$$

where X is a hydrolyzable group, (3) an organometallic salt and (4) an organic solvent.

Silicone coated cellulosic papers are used extensively as backing strips for pressure sensitive adhesive coated bumper stickers, electrician's tapes, bandages, and other materials containing a pressure sensitive adhesive backing. Silicone release coatings also have application on cellulosic papers which are used as confining and shipping means for various highly adhesive materials. Such adhesive materials include organic compositions such as asphalt or pitch, tar, various unvulcanized rubbers, particularly synthetic rubbers, high molecular weight organic polymers used as adhesives, etc. The silicone release coating allows the confining and shipping means to be readily separated or stripped from the cargo which they contain or from other bodies which carry the highly adhesive materials.

Various methods have been employed to apply silicone to the surface of this type of paper. The coated paper is often referred to as anti-blocking paper or release paper. These methods generally involve applying a solution containing a silanol-stopped silicone fluid, a cross-linking agent, and a catalyst to the surface of a cellulosic paper, evaporating the solvent, and curing the silicone on the surface.

One such method for treating the paper to render it anti-blocking is set forth in U.S. Pat. 2,985,544 of De Monterey. This method comprises treating the paper with an aqueous emulsion comprising (1) a linear polydimethylsiloxane containing terminal silicon-bonded hydroxy groups, (2) a methylpolysiloxane resin having a ratio of from 1.05 to 1.4 methyl groups per silicon atom, (3) polyvinyl alcohol as an emulsifying agent, and (4) dibutyl tin dilaurate, there being employed on a weight basis from 2 to 6 parts of the linear polydimethylsiloxane per part of methylpolysiloxane resin.

Another method for treating paper to render it anti-blocking is disclosed in U.S. Pat. 2,985,545, Leavitt. This method comprises treating the paper with an aqueous emulsion containing as essential ingredients (1) a linear polydimethylsiloxane containing terminal silicon-bonded hydroxy groups, (2) a small amount of a methyl-hydrogenpolysiloxane, and (3) a tin salt.

2

The basic concept involved in the above paper coating methods is the cross-linking of a silanol-stopped silicone fluid on the surface of the paper by use of a cross-linking agent. In the above instances, a silicone resin and a methylhydrogen fluid were used as the cross-linking agents. Other cross-linking agents have also been shown in the art to be useful to form release coatings on paper. For example, U.S. Pat. 2,985,546 of Leavitt discloses a silicone release coating which has been cross-linked with a polyalkyl silicate and U.S. Pat. 3,385,727 of Thomas discloses a release film which has been cross-linked with methyltriacetoxysilane.

While the methods of the prior art were effective to produce good release coatings, their principal drawback was that the time required for the coating to cure was too long. In an attempt to decrease the cure time, trimethylsilyl end-stopped polymethylhydrogensiloxane fluids have been combined with other cross-linking agents and the combination used in paper coating compositions. This has resulted in an improvement in the cure time. However, release paper so coated was subject to gassing, i.e., hydrogen liberation upon standing and contemporaneously with the hydrogen liberation, the paper lost abhesiveness.

Another attempted solution to the problem of lengthy, slow cure time for paper release coatings has been the use of high temperatures. The use of high temperatures, however, to decrease the cure time of release coatings has resulted in the creation of other problems. High temperatures cause paper to dry out and shrink and also results in the silicone coating being less abhesive.

It is, therefore, an object of this invention to provide a method for rendering cellulosic fiber sheet materials non-adherent to normally adhering substances by treating with a coating material which can be cured within a non-degradeable temperature range.

It is a further object of this invention to provide a method for rendering cellulosic fibrous sheet materials non-adherent to normally adherent substances by treatment with a solution containing a low temperature curing, non-migrating, non-smearing silicone composition.

In accordance with my invention, a method has been found for providing a silicone release coating which can be rapidly cured within a desired temperature range, and be non-migrating, while still providing the desired release properties, while avoiding gassing and the attendant loss of abhesion during storage.

Briefly, the compositions which are used to obviate the above-mentioned problems and provide a release coating which is cured at low temperatures rapidly and efficiently comprise an organic solvent solution of (1) a linear polydimethylsiloxane gum having terminal silicon-bonded hydroxyl groups, (2) a silane having 3 hydrolyzable substituents and one silanic hydrogen group, and (3) an organometallic salt catalyst such as dibutyl tin dilaurate.

The polydimethylsiloxanes employed in the practice of the present invention are those having the general formula:

(1)

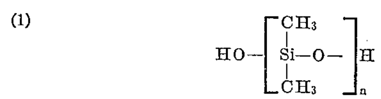

where $n$ is an integer equal to at least 4500, for example, 4500 to 7500. These polydimethylsiloxanes containing terminal silicon-bonded hydroxyl groups are soluble in organic solvents such as benzene, toluene, xylene, trichloroethylene, etc. The minimum average number of dimethylsiloxy units is required to provide a penetration level for the gum sufficient to give the necessary properties to the ultimate release coating. The maximum penetration which can be used is about 1500, a penetration corresponding to a polydimethylsiloxane gum having a molecular weight of about 350,000 and a viscosity of about 10,000,000 centistokes. The penetration is measured in 0.1 mm./min. using A.S.T.M. Standard Test No. D–217–60 T with a modified plunger or foot. The plunger or foot utilized to measure the penetration of the polydimethylsiloxane gums described in this application consists of a cylinder ¼″ in diameter and 3⁄16″ long formed of brass and attached to a shaft of steel having a diameter of ⅛″ and a length of approximately 5⅛″. This plunger weighs approximately 9.1 g. For purposes of the test, a 100 g. load is placed on the shaft. The preferred gums are those having the lowest penetrations, and thus the highest molecular weights. The lowest penetration gums provide coatings which are smear resistant, and thus are the most desirable for purposes of release. The viscosities referred to in the present application are those measured at 25° C.

These polydimethylsiloxane gums can be prepared by any one of several well known methods. Thus, the high viscosity polydimethylsiloxanes can be obtained by condensing the hydrolysis product of dimethyldichlorosilane with either acidic or alkaline catalysts such as hydrochloric acid, sulfuric acid, potassium hydroxide, etc. Alternatively, one can heat cyclic polymers of the formula:

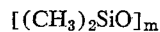

$$[(CH_3)_2SiO]_m$$

where $m$ is an integer equal to from 3 to 6, for instance, octamethylcyclotetrasiloxane, with an alkaline catalyst such as potassium hydroxide in an amount of from 0.001 to 0.1% based on the weight of the octamethylcyclotetrasiloxane, at temperatures of from 125° C. to 175° C. for times ranging from about 15 minutes to 2 hours or more and thereafter, if desired, removing the alkaline catalyst. By treating the material with water and heating, terminal hydroxyl groups will be formed on the polydimethylsiloxane. This yields a polydimethylsiloxane of Formula 1 having a viscosity of from about 10,000,000 to 50,000,000 or more centipoises when measured at 25° C.

The silanes used to cure the silanol chain-stopped polydimethylsiloxane gum have the formula:

(2) $$HSiX_3$$

where X is a hydrolyzable radical selected from the class comprising lower acyloxy radicals, lower alkoxy radicals, and lower dialkylaminoxy radicals. Lower, as used above, refers to alkyl groups having carbon chain lengths of less than 8 carbon atoms. More specifically, X is a hydrolyzable radical selected from the class comprising lower alkoxy radicals, e.g., methoxy, ethoxy, propoxy, butoxy radicals; lower dialkylaminoxy radicals, e.g., diethylaminoxy, ethylpropylaminoxy, dibutylaminoxy, methylethylaminoxy radicals; and lower acyloxy radicals, e.g., formoxy, proponoxy, butyroxy radicals. The preferred radicals are the acetoxy, the methoxy, and the diethylaminoxy radicals, particularly the acetoxy radical. An excess of the silane on a molar basis with relation to the silanol chain-stopped gum is always necessary if a bath life of long duration is required. To provide this excess, the amount of silane used should be in the range of from 0.1 to 5 weight percent of the silane based on the silanol chain-stopped gum. The preferred range of silane is from 0.25 to 3 weight percent. If the level of the silane is raised beyond 5 percent, the cured coating does not possess optimum release properties. If less than 0.1 weight percent of the silane is present, there is a danger of premature bath gelation. However, less than 0.1 weight percent of silane in the bath results in faster cure of the release coating and can be used in modern equipment which mix the bath ingredients in line on the way to the bath and immediately thereafter applies the bath to the paper surface.

Various organometallic salts can be used as catalysts with the silanol gum-silane mixture. In general, these catalysts comprise the organometal salts of fatty acids. Exemplary of such salts are dibutyl tin dilaurate, zinc octoate, stannous octoate, dibutyl tin dioctoate, etc. Based on the silanol chain-stopped gum, there should be from 0.3% to 10% of the catalyst (as metal). Below the level of 0.3%, sufficiently rapid cure at low temperatures is not achieved; if more than 5% of the cure promoting catalyst is present, an undesirable film of the salt remains on the surface of the polysiloxane coating which can migrate to the adhesive surface which is in contact with the release coating. In packaging many organic materials, such migration is not harmful and up to 10% of catalyst can be employed.

The polysiloxane coating is applied to the paper through the use of a solvent solution of the various materials. Stability of the solution with respect to bath life depends upon the concentration of the silanol chain-stopped polydimethylsiloxane gum and the silane in the solution and upon the ratio of the silane to the gum. The maximum concentration to provide a reasonable bath life is approximately 10% solids. With 10% or less solids a longer bath life may be achieved. However, it is uneconomical to use a solution containing less than 1% solids.

It is preferable to operate with a minimum amount of solution in the bath and feed two solvent solutions into the bath, i.e., one solvent solution containing the silanol chain-stopped poly dimethylsiloxane gum and the catalyst and one solution containing the hydrolyzable radical substituted silane. An alternative is to have the reactants in one solvent and the catalyst in a second solvent and to mix the two solutions at the bath. Here, obviously, the two solutions are mixed at the time of use, thus eliminating any storage stability problems.

Within the limits stated above, the coating solutions of the present invention can have an overall composition by weight as follows:

| | Parts |
|---|---|
| (1) Polydimethylsiloxane gum containing silanol chain terminals | 1–29 |
| (2) $HSiX_3$ | 0.005–0.45 |
| (3) Organometal salts of fatty acids | [1] 0.003–0.36 |
| (4) Solvent | 70–98 |

[1] As metal.

A preferred range of substituents for the composition is as follows:

| | Parts |
|---|---|
| (1) Polydimethylsiloxane gum containing silanol chain terminals | 1–29 |
| (2) $HSiX_3$ | 0.008–0.375 |
| (3) Organometal salts of fatty acids | [1] 0.003–0.36 |
| (4) Solvent | 70–98 |

[1] As metal.

A wide variety of solvents can be used for the coating solution. Particularly, the solvents can be aromatic solvents such as benzene, toluene, and xylene. Additionally, solvents such as tetrahydrofuran, esters such as ethyl acetate, ketones such as methyl ethyl ketone, and substituted aromatic compounds such as chlorobenzene, may be utilized. The order of addition of the various reactants to the solvent solutions is immaterial.

As was previously described, an object of the present invention is to provide a solution which allows a release coating to be placed on paper and cured within a very short space of time. Moisture will initiate the cure of the material of the present invention and the moisture necessary for the cure is derived from moisture in the air, moisture in the paper, and moisture in the bath. Moisture normally present during the coating operation is sufficient and no additional moisture need be added. When the cure promoting catalyst is present in optimum quantity at temperatures of from 175° F. to 250° F., the various coatings may be cured in approximately 5 to 20 seconds which is a reduction by 50% and more of the time required by prior art methods. When the paper is coated in high speed paper coating machinery, halving of the cure time will double the production rate. It follows that low cure times are imperative for optimum economic operation. While the preferred temperature range is 175° F. to 250° F., a temperature range of 150° F. to 500° F. may be used. Higher temperatures are undesirable because of dehydration of the paper being coated. If the reaction temperature is lower, the cure will require a longer time.

The coating of the present invention is normally used on paper to be used as a backing strip commonly known as release paper. For practical release applications, there should be a uniform coating of the cured polydimethylsiloxane gum in an amount of approximately one-half pound per 3000 square feet. To make sure that the entire paper is coated, up to one pound of polydimethylsiloxane gum can be employed per 3000 square feet, greater amounts of gum being uneconomical. A release coating which is workable, however, is produced with 0.2 pound polydimethylsiloxane gum per 3000 square feet providing there is uniform coverage.

Following treatment of the paper with the solution of the present invention, the paper is advantageously dried by the use of circulating hot air. This curing step will bring out the optimum release properties of the paper without further heat treatment. Such optimum release properties are immediately available without requiring aging or storage of the treated paper.

The following examples are illustrative of the use of the process of the present invention and should not be considered as limiting in any way its full scope as covered by the appended claims. Unless otherwise specified, all parts are by weight except that the 50—50 xylene methyl ethyl ketone solvent is 50—50 on a volume basis.

The triacetoxysilane used in examples 1 through 8 was prepared according to the following procedure: Into a glass lined kettle equipped with a cooling jacket was charged 56.75 parts of acetic anhydride and 18.40 parts of toluene. To the mixture was added slowly, through a dip tube, 24.85 parts of trichlorosilane. The mixture was agitated throughout the addition. The reaction was moderately exothermic. The addition rate was controlled to give a maximum kettle temperature of 23° C. The addition required one hour and 20 minutes. After the addition of the silane was complete, acetyl chloride, toluene, and excess acetic anhydride were stripped from the kettle at 20 mm. pressure and 176° F. The reaction product was triacetoxysilane.

EXAMPLE 1

A treating bath was prepared containing 5 parts of a silanol chain-terminated polydimethylsiloxane gum having a viscosity of 10,000,000 centipoises and a penetration of 1500, 0.17 part of a trimethylsilyl chain-stopped methyl hydrogen fluid containing 25 methyl hydrogen siloxy units per molecule, 0.58 part of a 35% dibutyl tin di-2-ethylhexoate in xylene solution, 0.042 part of triacetoxysilane, 11.5 parts of a 50—50 by volume mixture of xylene and methyl ethyl ketone, and 82.7 parts of toluene. The bath was applied to a clay coated paper by a standard metering technique to provide a coating of 1 pound of gum per 3000 square feet of paper. The paper was then heated by circulating hot air at 300° F. for 5 seconds. The paper coated as just described was found to have release properties normally found in silicone coatings cured for much longer periods of time.

The release coated paper was tested using Johnson & Johnson surgical tape and found to have an adhesion of 10 to 15 pounds per inch width. There was no evidence of migration when the tape was subjected to the subsequent adhesion tests described by the proposed TAPPI procedure. The adhesion test involves placing the tape which has been removed from the silicone coated paper on a clean 302 stainless steel panel having a 12 to 16 micro inch ground finish. The tape is rolled with a 4.5 pound roller once in each direction and is then allowed to remain for 30 minutes at 73° F. and 50% relative humidity. The migration is determined by pulling the tape from the stainless steel panel and comparing the adhesion with that of a tape which has not previously been applied to a silicone coated paper. The adhesion obtained for the paper was the same when it was tested immediately after curing, after aging for one month and after aging for 2 months. The paper was used as a backing strip for bumper stickers.

CONTROL EXAMPLE

Example 1 was repeated and was in all respects identical except that methyltriacetoxysilane was used to replace the triacetoxysilane. A minimum time of 20 seconds at 300° F. was required to cure the silicone coating on the paper, as compared with a cure time of 5 seconds using triacetoxysilane.

EXAMPLES 2–8

The following table sets forth the minimum time in seconds required for cure, when the concentration of the silane cross-linking agent and the temperature are varied. Methyltriacetoxysilane was used in the control examples in order to show the superiority of triacetoxysilane as a cross-linking agent in paper coating compositions. Except for the variations set forth in the table and an insignificant variation in the amount of toluene solvent used, the coating conditions and compositions were identical to those set forth in Example 1. The baths of Examples 2 through 8 each contain 5 parts of a silanol chain-terminated polydimethylsiloxane gum having a viscosity of 10,000,000 centipoises, 0.17 part of a trimethylsilyl chain-stopped polymethyl hydrogen siloxane fluid containing 25 methyl hydrogen siloxy units per molecule, 11.5 parts of a 50—50 by volume mixture of xylene and methyl ethyl ketone, 0.58 part of a 35% dibutyl tin di-2-ethylhexoate in xylene solution, cross-linking agent as given in Table 1, and sufficient toluene to make a total of 100 parts of bath solution. In the table, Parts of Crosslinker refers to the parts of $HSi(OAc)_3$ and $CH_3Si(OAc)_3$. $HSi(OAc)_3$ represents triacetoxysilane and $CH_3Si(OAc)_3$ represents methyltriacetoxysilane.

TABLE 1

| | Parts of cross-linking agent | ° F. | Cure time (seconds) | |
|---|---|---|---|---|
| | | | $CH_3Si(OAc)_3$ | $HSi(OAc)_3$ |
| Example: | | | | |
| 2 | 0.0835 | 200 | 15 | 5 |
| 3 | 0.0835 | 250 | 15 | 5 |
| 4 | 0.0835 | 300 | 15 | 5 |
| 5 | 0.167 | 175 | 20 | 5 |
| 6 | 0.167 | 200 | 15 | 5 |
| 7 | 0.167 | 250 | 15 | 5 |
| 8 | 0.167 | 300 | 15 | 5 |

EXAMPLE 9

A coating bath solution was formulated by thoroughly mixing 2 parts of a silanol-end-stopped polydimethylsiloxane gum having a penetration of 1500 and a viscosity of 10,000,000 centipoises, 0.134 part of $HSi(OC_2H_5)_3$, 0.27 part of a 35% solution of dibutyl tin di-2-ethylhexoate in xylene, 4.55 parts of xylene and 43.13 parts of toluene. This bath was used to coat a super-calendered kraft paper at a level of 0.75 pound of silicone solids per 3000 square feet and the coated paper was cured for 30 seconds at 175° F. The resulting coating was smear-free and well anchored to the paper. The coating was then aged in contact with Johnson & Johnson adhesive surgical tape for four weeks at 72° F. The release measured at a peel rate of 50 inches per minute, was 13 grams per inch initial release and 13 grams per inch release after four weeks of aging in contact with the release paper. The coating bath had a working life of 36 hours.

EXAMPLE 10

A bath identical in all respects to that of Example 9 was used to coat super-calendered kraft paper at a level of 0.75 pound of silicone solids per 3000 square feet of paper. The coating was cured using hot air for 2 minutes at 150° F. The coating was smear-free and well anchored with no detectable rub-off. The paper coated with this release coating when tested using Johnson & Johnson surgical tape had an initial release value of 18 grams per inch and after 5 weeks of aging the release value had increased slightly to 19 grams per inch. The same technique was used for measuring the release values as was used in Example 9.

EXAMPLE 11

A coating bath solution was prepared by mixing 2.0 parts of a silanol-stopped polydimethylsiloxane having a viscosity of 10,000,000 centipoises and a penetration of 1500, 4.67 parts of xylene, 0.002 part of trimethoxysilane and 43.13 parts of toluene. The solution was fed into a bath as used. As the solution was fed into the bath, 0.27 part of a 35% solution of dibutyl tin di-2-ethylhexoate in xylene was uniformly injected into the bath solution. The bath solution was coated onto super-calendered kraft paper at a solids deposition rate of 0.75 pound per 3000 square feet and cured for 15 seconds at 175° C. This gave a smear-free cure. Initial aged release at 50 inches per minute of styrene butadiene rubber (SBR) adhesive was 13 grams per inch and after four weeks storage during which time the release paper was in contact with the SBR adhesive, the relase time remained 13 grams per inch.

Due to the low concentration of triethoxysilane, the working life of this bath was only 15 minutes which is why the catalyst was injected in line immediately before the bath was coated on the paper.

EXAMPLES 12–17

The baths of Examples 12 through 17 each contain 5 parts of a silanol chain-terminated polydimethylsiloxane gum having a viscosity of 10,000,000 centipoises, 0.17 part of a trimethylsilyl chain-stopped polymethyl hydrogen siloxane fluid containing 25 methyl hydrogen siloxy units per molecule, 11.5 parts of a 50—50 by volume mixture of xylene and methyl ethyl ketone, 0.58 part of a 35% dibutyl tin di-2-ethylhexoate in xylene solution, amounts of cross-linking agent as set forth in Table 2, and sufficient toluene to make a total of 100 parts of bath solution.

TABLE 2

| | Parts of $HSi[ON(C_2H_5)_2]_3$ | ° F. | Cure time (seconds) |
|---|---|---|---|
| Example: | | | |
| 12 | 0.042 | 175 | 20 |
| 13 | 0.042 | 200 | 10 |
| 14 | 0.0835 | 175 | 15 |
| 15 | 0.0835 | 200 | 10 |
| 16 | 0.167 | 175 | 15 |
| 17 | 0.167 | 200 | 10 |

The release coated paper produced using each of the above-described baths was tested and found to have an adhesion of from 10 to 15 pounds per inch using the initial adhesion test described in Example 1.

It is apparent from this disclosure that an improved method of coating paper sheets at improved operating speeds has been provided. The amount of silanol-terminated polydimethylsiloxane, hydrolyzable groups substituted silane, and organometal salt catalyst can be varied within wide limits as previously disclosed. The materials and processes described are equally applicable to one-step coating processes and to continuous processes for providing these coatings on paper. Standard paper making or paper converting equipment can be readily employed in connection with the treating operations and no precautions need be taken for antitoxic materials which may be contained in the solution other than those normally observed for the particular organic solvents.

What I claim as new and desire to secure by Letters Patent of the United States is:

1. A composition comprising, by weight, (i) from 1 to 29 parts of a linear polydimethylsiloxane gum containing terminal silicon-bonded hydroxyl groups, (ii) from 0.005 to 0.45 part of a silane having the formula, $$HSiX_3$$

where X is a hydrolyzable radical selected from the class comprising lower acyloxy radicals, and lower dialkylaminoxy radicals, (iii) from 0.03 to 0.36 part as metal of an organometal salt of a fatty acid, and (iv) from 70 to 98 parts of an organic solvent.

2. The composition of claim 1, wherein the silane is triacetoxysilane.

3. The composition of claim 1, wherein the silane is present in an amount of from 0.008 to 0.375 part.

4. The composition of claim 1, wherein the organometallic salt is dibutyl tin dilaurate.

5. A composition comprising, by weight, (i) from 1 to 29 parts of a linear polydimethylsiloxane gum containing terminal silicon-bonded hydroxyl groups, (ii) from 0.005 to 0.45 part of a silane having the formula, $$HSiX_3$$

where X is a hydrolyzable radical selected from lower alkoxy radicals, (iii) from 0.03 to 0.36 part as metal of an organometal salt of a fatty acid, and (iv) from 70 to 98 parts of an organic solvent.

References Cited

UNITED STATES PATENTS 2,985,544 5/1961 De Monterey et al. ___ 117—143
2,985,545 5/1961 Leavitt _____________ 117—143
2,985,546 5/1961 Leavitt _____________ 117—143
3,127,363 3/1964 Nitzsche et al. ________ 260—18
3,359,237 12/1967 Boissieras et al. _____ 260—46.5
3,385,727 5/1968 Thomas et al. _______ 117—155
3,419,508 12/1968 Grenoble ____________ 260—18

DONALD E. CZAJA, Primary Examiner

M. I. MARQUIS, Assistant Examiner

U.S. Cl. X.R.

117—155; 260—30.4, 31.2, 32.8, 33.6, 33.8, 46.5